United States Patent
Wang et al.

(10) Patent No.: US 12,535,608 B2
(45) Date of Patent: Jan. 27, 2026

(54) SYSTEMS AND METHODS FOR RECURSIVE 3D WAVELET PACKET TRANSFORMS

(71) Applicant: SAUDI ARABIAN OIL COMPANY, Dhahran (SA)

(72) Inventors: Jinsong Wang, Dhahran (SA); Saleh A. Dossary, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 404 days.

(21) Appl. No.: 18/181,418

(22) Filed: Mar. 9, 2023

(65) Prior Publication Data

US 2024/0302556 A1    Sep. 12, 2024

(51) Int. Cl.
  *G01V 1/36*    (2006.01)
(52) U.S. Cl.
  CPC ........ *G01V 1/364* (2013.01); *G01V 2210/324* (2013.01); *G01V 2210/48* (2013.01)
(58) Field of Classification Search
  CPC ............. G01V 1/364; G01V 2210/324; G01V 2210/48; G01V 2210/23
  See application file for complete search history.

(56) References Cited

U.S. PATENT DOCUMENTS

| | | | | |
|---|---|---|---|---|
| 6,567,081 B1 * | 5/2003 | Li | ............................ | G06T 9/007 345/419 |
| 6,745,129 B1 * | 6/2004 | Li | ............................ | G01V 1/30 702/17 |
| 6,931,067 B2 | 8/2005 | Jang | | |
| 7,616,524 B1 * | 11/2009 | Gersztenkorn | .......... | G01V 1/30 367/38 |
| 2002/0131497 A1 * | 9/2002 | Jang | ....................... | H04N 19/63 375/E7.041 |
| 2013/0253838 A1 * | 9/2013 | Tegtmeier-Last | ...... | G01V 1/308 702/17 |
| 2017/0075009 A1 * | 3/2017 | Khalil | .................... | G01V 1/364 |
| 2021/0158104 A1 * | 5/2021 | Wu | ....................... | G06V 10/764 |

OTHER PUBLICATIONS

Written Opinion and International Search Report from corresponding PCT Application No. PCT/US2024/019143 mailed May 27, 2024.

Cai, HP., He, ZH., Li, YL et al. An adaptive noise attenuation method for edge and amplitude preservation. Appl. Geophys. 11, 289-300 (2014).

(Continued)

*Primary Examiner* — Manuel A Rivera Vargas
(74) *Attorney, Agent, or Firm* — Vorys, Sater, Seymour and Pease LLP

(57) ABSTRACT

In certain embodiments, a system includes a processor and a memory storing machine readable instructions executable by the processor, the machine readable instructions including a seismic image analysis tool having a wavelet packet transformer to generate sub-images of a received seismic image, a sub-image filter to perform noise suppression and edge detection on each sub-image, an inverse wavelet packet transformer to reconstruct higher level sub-images or seismic image from filtered sub-images, and a sub-image merger to recursively merge a sub-image and a reconstructed sub-image.

15 Claims, 6 Drawing Sheets

(56) References Cited

OTHER PUBLICATIONS

Sreekala Kannoth, Dr and Sateesh Kumar. "Enhancement Of Atmospheric Turbulence Distorted Images Using Wavelet Packet Transform." (2020).
Christopher Beale, Christopher Niezrecki, Murat Inalpolat, An adaptive wavelet packet denoising algorithm for enhanced active acoustic damage detection from wind turbine blades, Mechanical Systems and Signal Processing, vol. 142, 2020.
Qi Wang, Ping Geng, Junbo Chen, Chuan He, Dynamic discrimination method of seismic damage in tunnel portal based on improved wavelet packet transform coupled with Hilbert-Huang transform, Mechanical Systems and Signal Processing, vol. 188, 2023.
Mallat S , 1989, A Theory for Multiresolution Signal Decomposition: The Wavelet Representation, IEEE, Transactions on pattern Analysis and machine intelligence, vol. 11, No. 7, Jul. 1989.
Coifman, R. R., Y. Meyer, and V. Wickerhauser, 1992, Size properties of wavelet-packets, in M. B. Ruskai et al., eds., Wavelets and Their Applications: Jones and Bartlett, 453-470.
S. Mallat, W. L. Hwang, 1992, Singularity detection and processing with wavelets, IEEE Trans. Inform. Theory, vol. 38, No. 2, pp. 617643.
Sweldensw, 1995, The lifting Scheme: A new philosophy in biorthogonal wavelet constructions. Wavelt Applications in Signal and Image Processing III, 68-79.
W. Chiracharit, 2001, Detection of calcifications in digitized mammograms using wavelet packet analysis, The 2001 EEE International Symposium on vol. 2, pp. 253-256.
He Zheng-you, 2006, Wavelet Entropy Measure Definition and Its Application for Transmission Line Fault Detection and Identification, 2006 International Conference on Power System Technology.
M. Y. Gokhale, 2010, Time Domain Signal Analysis using Wavelet Packet Decomposition Approach, Int. J. Communications, Network and System Sciences, 3, 321-329.

\* cited by examiner

SYSTEMS AND METHODS FOR RECURSIVE 3D WAVELET PACKET TRANSFORMS

FIELD OF THE DISCLOSURE

The present disclosure relates generally to seismic image processing and analysis and, more particularly, to multi-level recursive 3D wavelet packet transform for noise suppression and edge detection.

BACKGROUND OF THE DISCLOSURE

Seismic imaging is commonly used for the identification of prospective hydrocarbon deposits in a subterranean formation, as well as a number of geological features and characteristics. Traditional seismic image analysis methods, however, fail to accurately extract the desired information due to the non-stationary character of the seismic signal. As such, wavelet transforms were introduced for seismic imaging analysis and enabled analysis to be performed at higher resolutions in both the time and frequency domains. The wavelet transform processes improved on the traditional seismic image analysis methods, but lacked critical sub-band information and would often yield inaccurate results. Subsequently, wavelet packet transform processes have been developed from discrete wavelet transforms for enhanced frequency analysis in the time domain, such that full sub-band analyses are possible. The wavelet packet transform processes have been expanded and are commonly used for 2D signals in multiple fields, but possess limitations such as limited noise reduction and data compression techniques. Further, due to the exponentially increasing number of sub-images required as the number of dimensions increases in seismic analyses and the additional dipping information included in 3D seismic imaging, conventional wavelet packet transform processes for 3D seismic images are challenging to perform and are ineffective at reducing noise and detecting edges.

Accordingly, techniques and systems which can accurately analyze 3D seismic images with noise reduction and edge detection capabilities are desirable.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

In certain embodiments, a system includes a processor and a memory storing machine readable instructions executable by the processor, the machine readable instructions including a seismic image analysis tool having a wavelet packet transformer to generate sub-images of a received seismic image, a sub-image filter to perform noise suppression and edge detection on each sub-image, an inverse wavelet packet transformer to reconstruct higher level sub-images or seismic image from filtered sub-images, and a sub-image merger to recursively merge a sub-image and a reconstructed sub-image.

In certain embodiments, a method includes performing a plurality of wavelet packet transforms on a three-dimensional seismic image and original sub-images, filtering a plurality of lowest-level sub-images, performing a plurality of inverse wavelet packet transforms on the plurality of lowest-level sub-images and subsequent reconstructed sub-images, merging the subsequent reconstructed sub-images with the original sub-images of a same wavelet packet transform level to generate merged sub-images, and generating a reconstructed three-dimensional seismic image.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
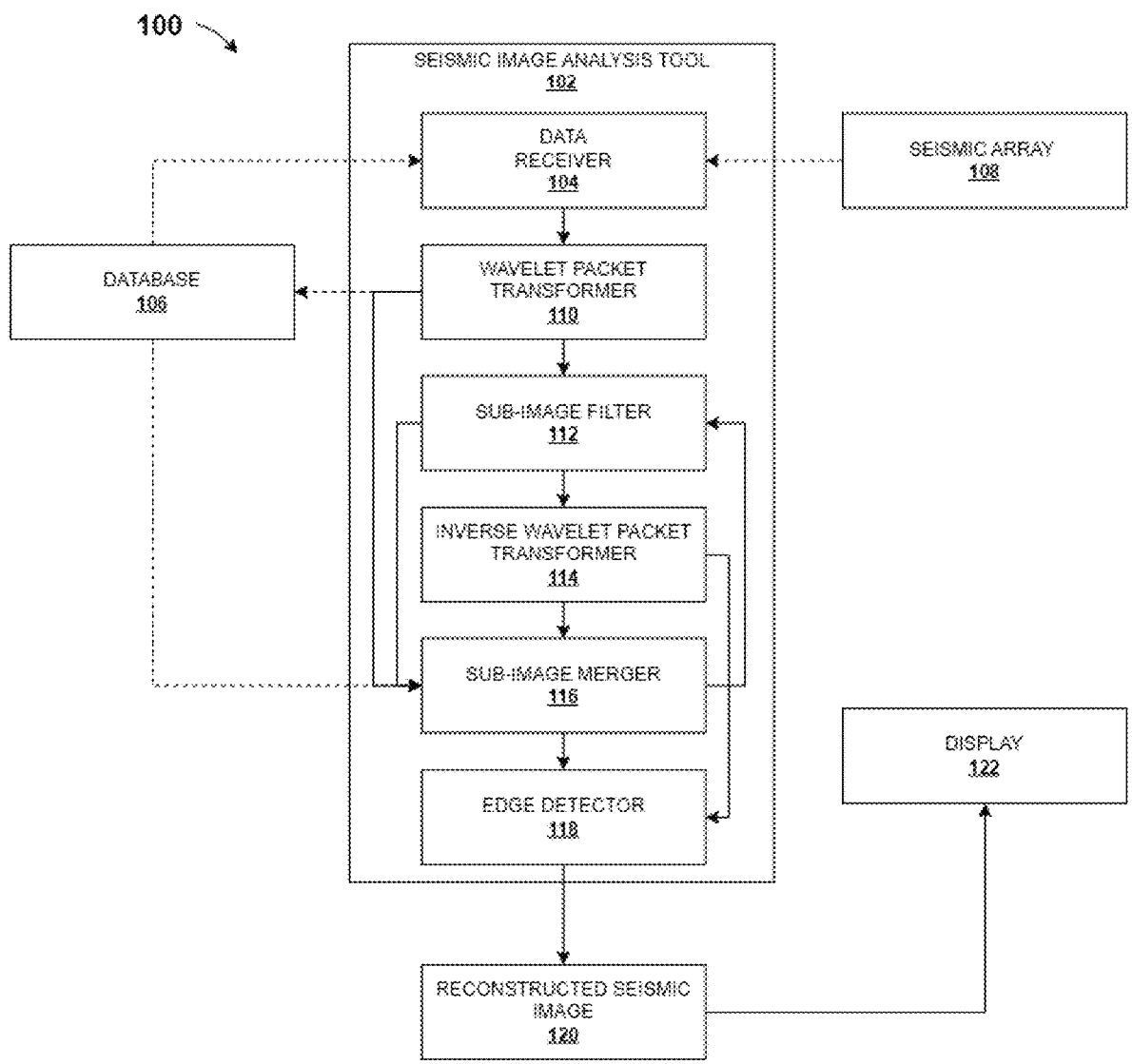
FIG. 1 is a block diagram of an example system in which a seismic image analysis tool is implemented for noise reduction, edge detection, and reconstruction.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to seismic image processing and analysis and, more particularly, to multi-level recursive 3D wavelet packet transform for noise suppression and edge detection. Unlike conventional wavelet packet transform, the systems and methods of the present disclosure may reduce noise, provide edge detection, and readily handle 3D wavelet packet transforms at multiple refinement levels. In some embodiments, filtering may include entropy-based background noise removal and Sobel filtering for the sub-images generated during wavelet packet transform. The systems and methods outlined herein may enable enhanced feature detection and higher accuracy seismic images in three dimensions while providing a robust time-frequency, multiresolution analysis with tunable parameters for a variety of applications.

FIG. 1 is a block diagram of an example system 100 in which a seismic image analysis tool 102 is implemented or employed for noise reduction, edge detection, and reconstruction of seismic images. The seismic image analysis tool 102 may include a data receiver 104 which receives or retrieves one or more three-dimensional seismic images. In some embodiments, the three dimensional seismic images may be received or retrieved from a database 106 in communication with the seismic image analysis tool 102, such that historical seismic images may be utilized for validation and externally sourced seismic images may be stored prior to analysis. In alternate embodiments, however, the data receiver 104 may receive or retrieve the seismic images directly from a seismic array 108 which has actively generated the three-dimensional seismic images. While the illustrated embodiment displays the data receiver 104 receiving or retrieving the seismic images from a database 106 and/or a seismic array 108, those skilled in the art will readily appreciate that the seismic images may be sourced from any device or component in communication with the seismic image analysis tool 102 and data receiver 104, without departing from the scope of this disclosure.

Utilizing one or more of the received or retrieved three-dimensional seismic images, the seismic image analysis tool 102 may employ a wavelet packet transformer 110 to begin the image correction process. In some embodiments, the wavelet packet transformer 110 may perform three levels of wavelet packet transform, such that a single seismic image may be filtered into 512 distinct sub-images. The number of dimensions of the input image, d, as well as the number of wavelet packet transform levels, j, directly relate to the number of generated sub-images generated, such that the number of sub-images is equal to $2^{j^d}$. This exponentially increasing number of sub-images, each of the same dimensions as the original, may require large amounts of processor power and storage capacity, such that three-dimensional images are rarely passed through multiple levels of wavelet packet transform. In some embodiments, the wavelet packet transformer 110 may employ Harr, Symlet, Daubechines (DB1 or DB4), or Bior68 wavelets for the wavelet packet transform. In at least one embodiment, the Daubechines DB4 wavelets are employed for their higher resolution and anti-aliasing capabilities, while maintaining computational efficiency, minimal data redundancy, and lower reconstruction error. However, those skilled in the art will readily appreciate that any viable wavelet may be employed by the wavelet packet transformer 110 without departing from the scope of this disclosure.

During the wavelet packet transform process, the wavelet packet transformer 110 may store each intermediate set of sub-images within a connected storage device, such as the database 106. The intermediate sets of sub-images may be utilized further in the image correction process, while the set of sub-images corresponding to the desired transform level may be provided to a sub-image filter 112 of the seismic image analysis tool 102.

The sub-image filter 112 may receive a set of sub-images and coefficients corresponding to the desired transform level, and may begin the post-processing of each sub-image and coefficient. The sub-image filter 112 may employ edge-oriented noise removal which detects the presence of an edge using a Sobel filter, such that the strong derivative gradients will be flagged as edges using a predefined threshold. The Sobel filter may detect edges meeting the threshold and assign a binary value to indicate an edge, while sub-images under the threshold may be defined with the opposite binary value to indicate noise that may be removed. The sub-image filter 112 may additionally employ an entropy calculation module for noise removal, such that the entropy of each sub-image may be calculated with respect to partitions of signal energy within each sub-image. A set of entropies may be computed before, or during, the entropy calculations of each sub-image as thresholds for entropy within each sub-image. For the highest entropy sub-images, the high levels of disorder or randomness may be designated as noise rather than ordered information and may be filtered out as background noise. Through the use of the Sobel filter, the entropy calculation module, or a combination thereof, the sub-image filter 112 may remove the noise inherent to seismic imaging while maintaining the detected edges throughout the filtering process.

The seismic image analysis tool 102 may include an inverse wavelet packet transformer 114, which may reconstruct the sub-images or original image from one level above the current wavelet packet transform level. The inverse wavelet packet transformer 114 may perform reconstruction utilizing the wavelets employed by the wavelet packet transformer 110 for the initial transformation through each level of the wavelet packet transformation. The image or sub-images reconstructed via the inverse wavelet packet transformer 114 may contain lower noise and higher edge definition following the filtering performed on the lower level wavelet packet transform, such that higher quality images or sub-images may be obtained after inversion. However, the seismic image analysis tool 102 may utilize a recursive process such that the multiresolution analysis is maintained, unlike the conventional seismic image analysis tools which directly invert the filtered sub-images to reconstruct the original image. The seismic image analysis tool 102 instead provides the initially reconstructed sub-images from the inverse wavelet packet transformer 114 to a sub-image merger 116 along with the originally stored sub-images from the wavelet packet transformer 110. In embodiments in which the sub-images were stored on the database 106, the original sub-images may be provided by, or retrieved from, the database 106 to the sub-image merger 116.

The sub-image merger 116 may receive or retrieve both the filtered, reconstructed sub-images and the original sub-images for merging, in which a pre-defined or tunable ratio may be utilized. The ratio may measure how much of the original sub-images should be maintained in the inverse transformation and reconstruction process. In some embodiments, a ratio of 0 would signify that none of the original sub-image is maintained and only the filtered, reconstructed sub-images are utilized, thus losing the recursive nature of the process. In at least one embodiment, a ratio of 0.5 is employed by the sub-image merger such that the original sub-images and the filtered sub-images are given equal weight, resulting in sub-images which maintain the original features of the sub-images without over-smoothing or over-filtering.

The merged sub-images generated by the sub-image merger 116 may be post-processed by the sub-image filter 112, such that the same filtering treatment may be applied to the result of the merging between the original sub-images and the sub-images reconstructed after lower level post-processing. As such, further noise reduction may be performed on the current level of sub-images while emphasizing the previously highlighted edges and further suppressing background noise. The resulting, post-processed sub-images may be inverted by the inverse wavelet packet transformer 114, and the reconstructed, higher-level sub-images may be merged with the original higher-level sub-images at the sub-image merger 116. The seismic image analysis tool 102 may perform this recursive loop back through each level of wavelet packet transform initially performed until the inverse wavelet packet transformer 114 outputs a filtered seismic image of the same level as the original input from the data receiver 104.

The inverse wavelet packet transformer 114 may provide the filtered seismic image to an edge detector 118 for final edge detection of the filtered image. In at least one embodiment, the edge detector 118 may be the same component as the sub-image filter 112, such that the edge detection methods may be applied by the sub-image filter 112 to the filtered seismic image. The edge detector 118 may determine the edges found in the filtered seismic images and may output a reconstructed seismic image 120 which contains flags or additional data denoting the detected edges. The reconstructed seismic image 120 may be output to a display 122 for user or operator viewing, such that an enhanced version of the original seismic image may be utilized in subterranean operations, such as hydrocarbon exploration activities, with higher quality features and higher resolution edges. The system 100 and the seismic image analysis tool 102 enable the filtering and reconstruction of three-dimensional seismic images, and may generate reconstructed seismic images 120 which enable higher accuracy subterranean operations. The recursive process carried out by the seismic image analysis tool 102 may provide enhanced noise suppression without losing features of the original seismic images.

Figure 2:
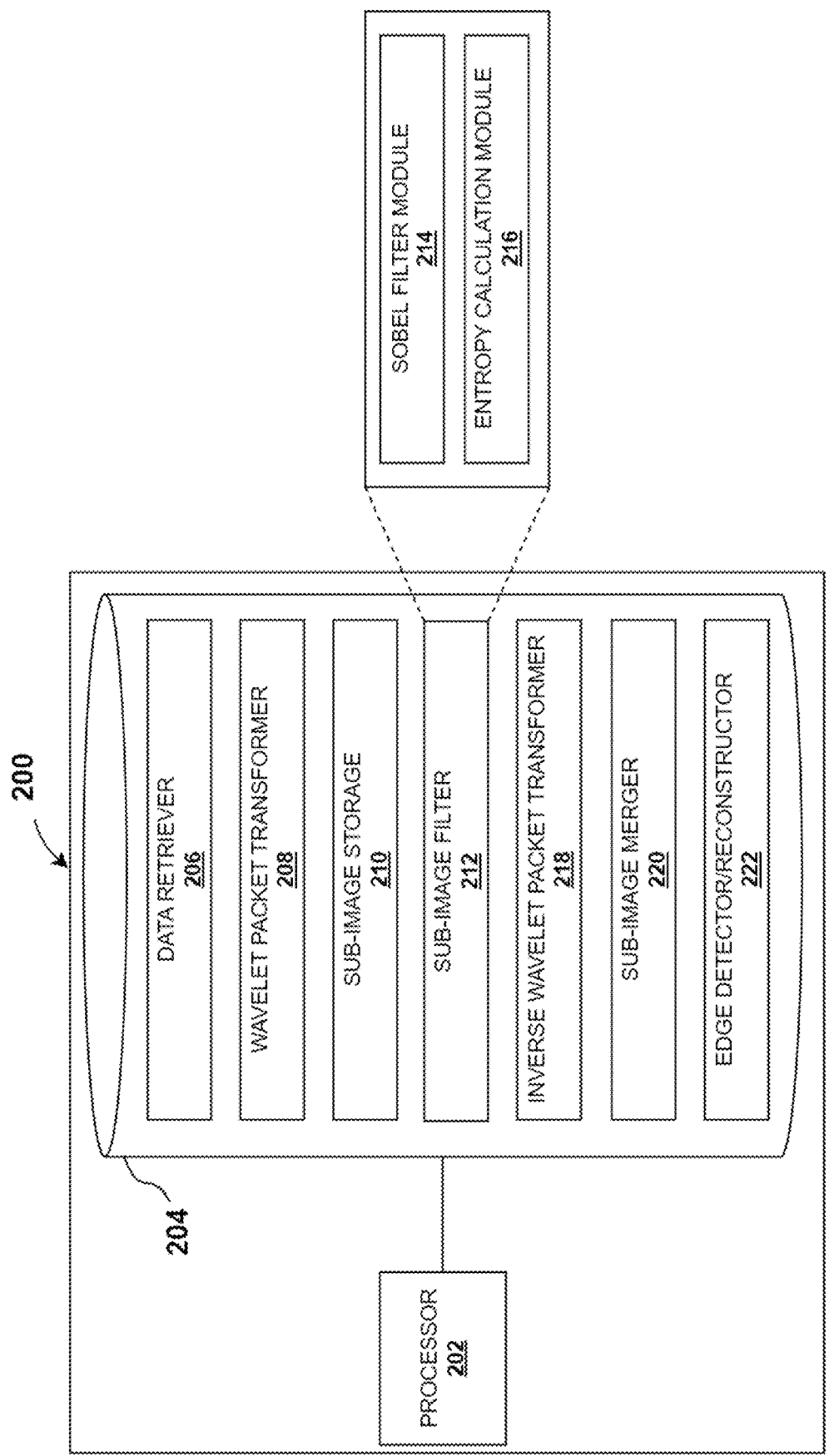
FIG. 2 is a block diagram of an example electronic device for noise suppression and edge detection of 3D seismic images using wavelet packet transforms.

FIG. 2 is a block diagram of an example electronic device 200 for noise suppression and edge detection of 3D seismic images using wavelet packet transforms. The electronic device 200 may be similar to the seismic image analysis tool 102 of FIG. 1, and as such, the electronic device 200 may be better appreciated with reference to FIG. 1. The electronic device 200 may include a processor 202 and memory 204 to implement the wavelet packet transform process on 3D seismic images. The memory 204 may represent a non-transitory machine-readable memory (or other medium), such as random access memory (RAM), a solid state drive, a hard disk drive, or a combination thereof. The one or more processors 202 can be implemented as one or more processor cores. In some examples, the one or more modules, shown in block form in FIG. 2, could be implemented in a computing cloud and on one or more servers including a server farm or cluster of servers. In such a situation, features of the device 200, such as the processor 202 and the memory 204 could be representative of a single instance of hardware or multiple instances of hardware with applications executing across the multiple instances (e.g., distributed) of hardware (e.g., computers, routers, memory, processors, or a combination thereof). Alternatively, the features of the device 200 could be implemented on a single dedicated server or workstation.

The memory 204 may include a data retriever 206 that may receive or retrieve data from a communicatively coupled device or database, such that one or more 3D seismic images may be input to the memory 204. The memory 204 may include a wavelet packet transformer 208, which, when implemented by the processor 202, may generate a series of sub-images from an original seismic image, such that dimension-specific data may be extracted, viewed, and manipulated. The wavelet packet transformer 208 may be employed several times in the noise suppression and edge detection of the 3D seismic images, such that multiple wavelet packet transform levels and multiple series of sub-images may be generated. In some embodiments, three levels of wavelet packet transform are performed by the wavelet packet transformer 208 and 512 sub-images may be generated. The sub-images generated by the wavelet packet transformer may be stored locally in the sub-image storage 210 of the memory 204, or may be externally stored for later use.

In some examples, the memory 204 may include a sub-image filter 212 which may first be utilized in the post-processing of the furthest transformed sub-images. The sub-image filter 212 may include several filter modules, including a Sobel filter module 214. The Sobel filter module 214 may flag the strong derivative gradients as edges using a predefined threshold within each sub-image. The Sobel filter module 214 may detect edges meeting the threshold and assign a binary value to indicate an edge, while sub-images under the threshold may be defined with the opposite binary value to indicate non-edge noise that may be removed. The sub-image filter 212 may additionally employ an entropy calculation module 216 for noise removal, such that the entropy of each sub-image may be calculated with respect to partitions of signal energy within each sub-image. For the highest entropy sub-images, the entropy calculation module 216 may designate the high levels of disorder or randomness as noise rather than ordered information and may be filtered out as background noise, such that the entire sub-image may be removed.

The memory 204 may include an inverse wavelet packet transformer 218 for the inversion of the wavelet packet transformations performed by the wavelet packet transformer 208. The inverse wavelet packet transformer 218 may reconstruct the higher level sub-images or seismic image from the post-processed sub-images output by the sub-image filter 212. The memory 204 may include a sub-image merger 220 which enables a recursive process, such that the sub-images generated by the wavelet packet transformer 208 and stored in the sub-image storage 210, or stored externally, may be merged with the reconstructed sub-images at a predefined ratio. The output, merged reconstruction of the sub-image merger 220 may be post-processed by the sub-image filter 212 and a loop may continue until a filtered, recursively generated, reconstructed seismic image is generated.

The memory may further include an edge detector/reconstructor 222 which may perform further filtering and post-processing on the reconstructed seismic image to denote or otherwise flag the edges in the reconstructed seismic image. The edge detector/reconstructor 222 may prepare the reconstructed seismic image for view by a user or operator, such that an enhanced version of the original seismic image may be utilized in subterranean operations, such as hydrocarbon exploration activities, with higher quality features and higher resolution edges.

In view of the structural and functional features described above, example methods will be better appreciated with reference to FIGS. 1-2. While, for purposes of simplicity of explanation, the example methods of FIGS. 1-2 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement the methods, and conversely, some actions may be performed that are omitted from the description.

Figure 3:
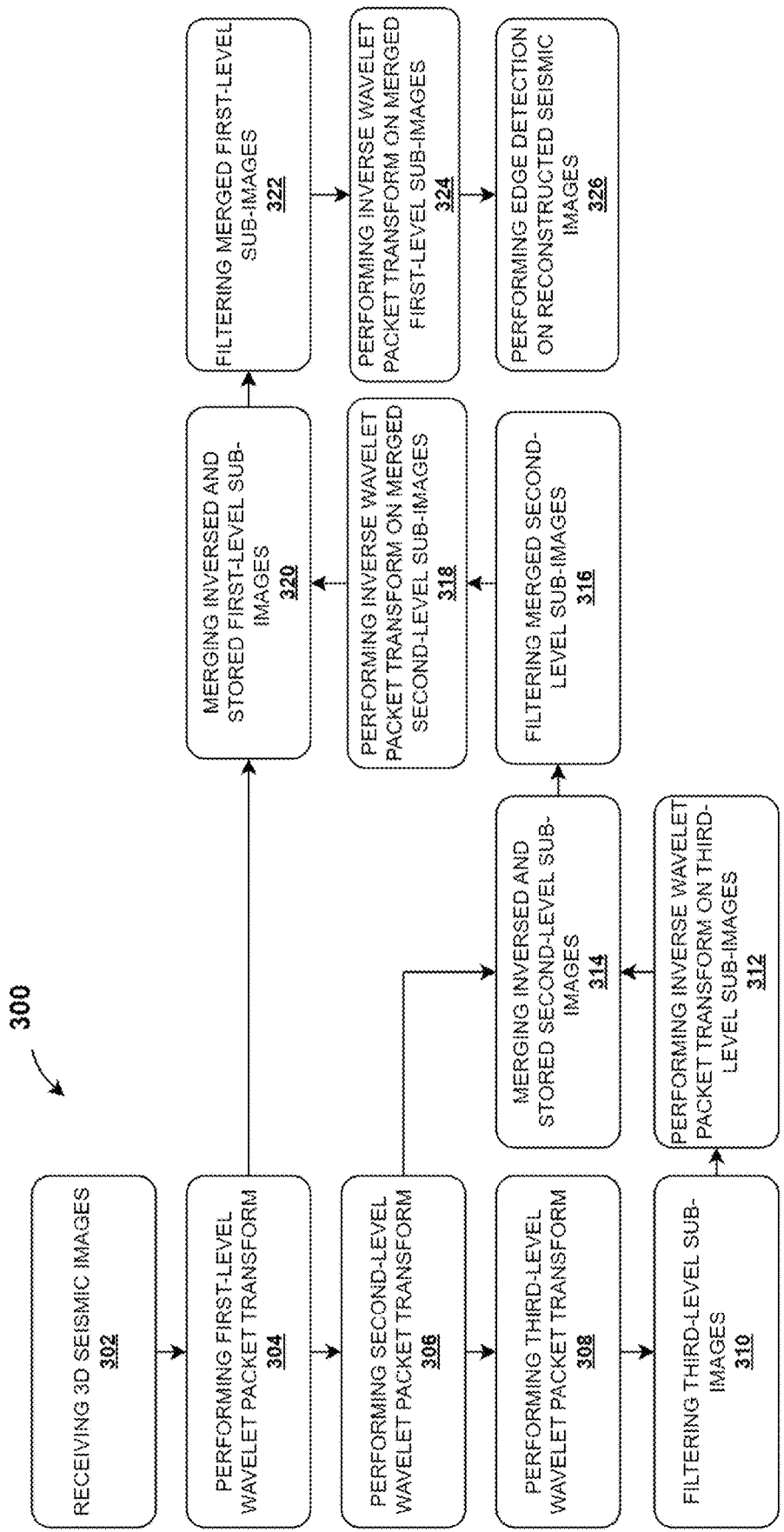
FIG. 3 is an example of a method for noise suppression and edge detection of 3D seismic images using wavelet packet transforms

FIG. 3 is an example of a method 300 for noise suppression and edge detection of 3D seismic images using wavelet packet transforms. The method 300 can be implemented by the system 100 or the electronic device 200, as shown in FIG. 1-2. Thus, reference can be made to the example of FIGS. 1-2 in the example of FIG. 3. The method 300 can begin at 302 by receiving one or more 3D seismic images, such that a data receiver or retriever (e.g., the data receiver 104 of FIG. 1, or the data retriever 206 of FIG. 2) may obtain seismic images for noise suppression and edge detection. At 304, a tool (e.g., the seismic image analysis tool 102 of FIG. 1, or the electronic device 200 of FIG. 2) may perform a first-level wavelet packet transform to generate eight sub-images of the original seismic image using a wavelet packet transformer (e.g., the wavelet packet transformer 110 of FIG. 1, or the wavelet packet transformer 208 of FIG. 2). At 304, the eight first-level sub-images may be stored on a database (e.g., the database 106 of FIG. 1, or the sub-image storage 210 of FIG. 2) for later use, and a copy may be utilized at 306 for a second-level wavelet packet transform to generate 64 total second-level sub-images from the 8 first-level sub-images. Similarly, the 64 second-level sub-images may be stored on a database for later use, and a copy may be utilized at 308 for a third-level wavelet packet transform resulting in 512 total third-level sub-images.

Each of the 512 third-level sub-images may be filtered at 310, using a sub-image filter (e.g., the sub-image filter 112 of FIG. 1, or the sub-image filter 212 of FIG. 2), such that Sobel filtering and entropy-based filtering may be applied to each of the third-level sub-images. The noise within each third-level sub-image may be filtered out at 310, and the post-processed third-level sub-images may be inverse wavelet packet transformed at 312. The 512 filtered third-level sub-images may be reconstructed into 64 filtered second-level sub-images at 312 using an inverse wavelet packet transformer (e.g., the inverse wavelet packet transformer 114 of FIG. 1, or the inverse wavelet packet transformer 218 of FIG. 2). The filtered second-level sub-images may be merged with the previously stored second-level sub-images at 314 to provide recursion to the method 300. The merging at 314 may be performed by a sub-image merger (e.g., the sub-image merger 116 of FIG. 1, or the sub-image merger 220 of FIG. 2) with a pre-defined ratio, such that the original features of the sub-images are maintained and the overall noise is reduced.

The merged second-level sub-images generated at 314 may be filtered at 316 using the same filter processes previously discussed. The re-filtering of the merged second-level sub-images at 316 may reinforce the detected edges and suppressed noise, such that better reconstruction may be performed. The 64 filtered, merged second-level sub-images may be reconstructed into 8 filtered, first-level sub-images at 318. The filtered, first level sub-images generated at 318 may be merged with the previously stored first-level sub-images at 320 to generate merged first-level sub-images and therefore adding further recursion to the method 300. As with the merged second-level sub-images, the merged first-level sub-images may be filtered at 322 with Sobel and entropy-based filters to further emphasize edges and suppress noise.

The 8 filtered, merged first-level sub-images may be reconstructed into a single reconstructed seismic image at 324 through a further inverse wavelet packet transform, such that a 3D seismic image may be generated with enhanced edges and suppressed noise. The 3D seismic image may undergo further filtering and edge detection at 326, such that the edges may be flagged or denoted, and the filtered, reconstructed 3D seismic image may be ready for use in subterranean operations and analysis with greater confidence.

Figure 4:
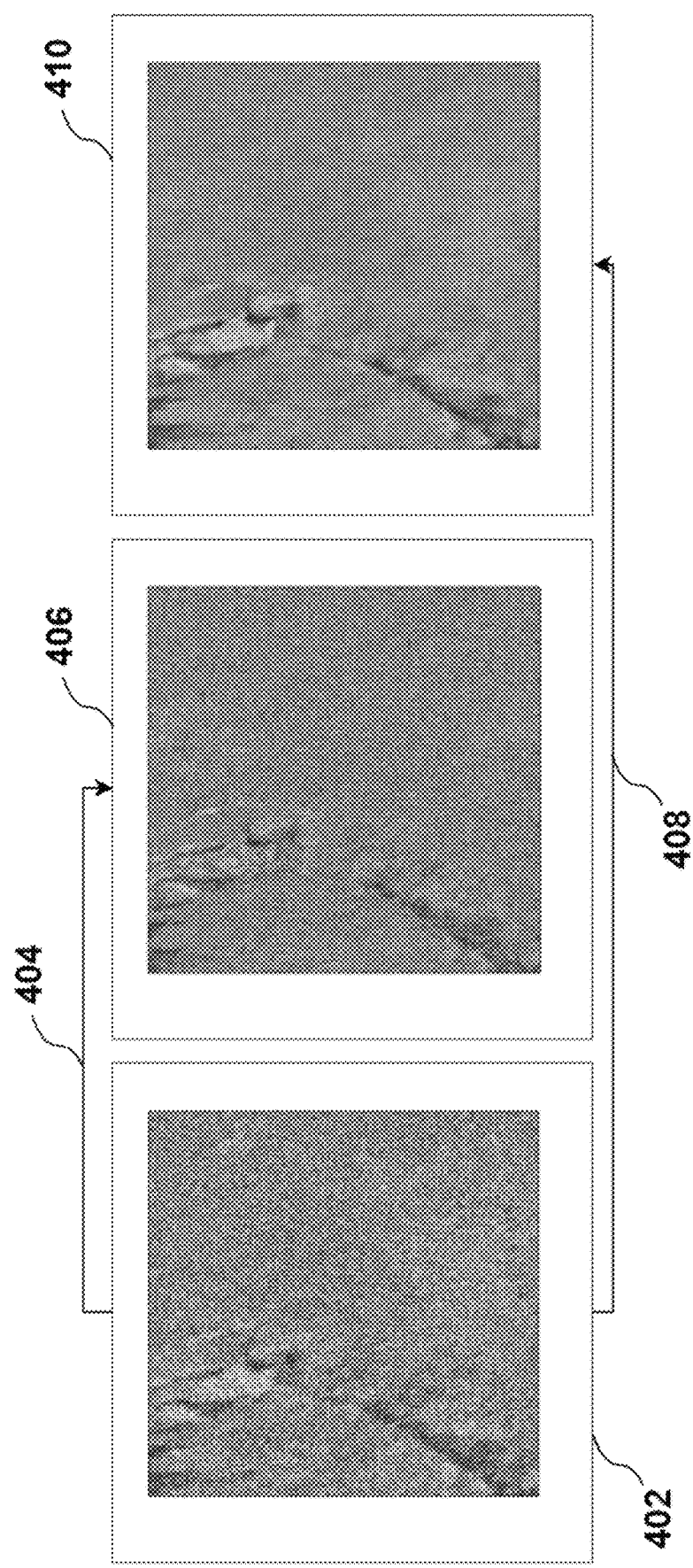
FIG. 4 is a series of example seismic image slices with varying analysis techniques.

FIG. 4 is a series of example seismic image slices with varying analysis techniques. The original seismic image slice 402 is a slice of a 3D seismic image prior to processing, noise suppression, or any additional analysis. Within the original seismic image slice 402, general features may be seen as well as high amounts of noise. Through the application of conventional wavelet packet transform 404 without the filtering and recursion outlined herein, the conventional seismic image slice 406 may be seen to have increased clarity, but high amounts of noise remain and the general features may be over-filtered and less defined. Comparatively, through the application of the wavelet packet transform 408 according to the present disclosure (e.g., the method 300), the present seismic image slice 410 may be seen to have increased clarity, further reduced noise, and sharper definition within the general features. The recursive nature of the proposed wavelet packet transform 408 enables enhanced noise suppression while maintaining clearer edge detection without blurring or loss of features.

Figure 5:
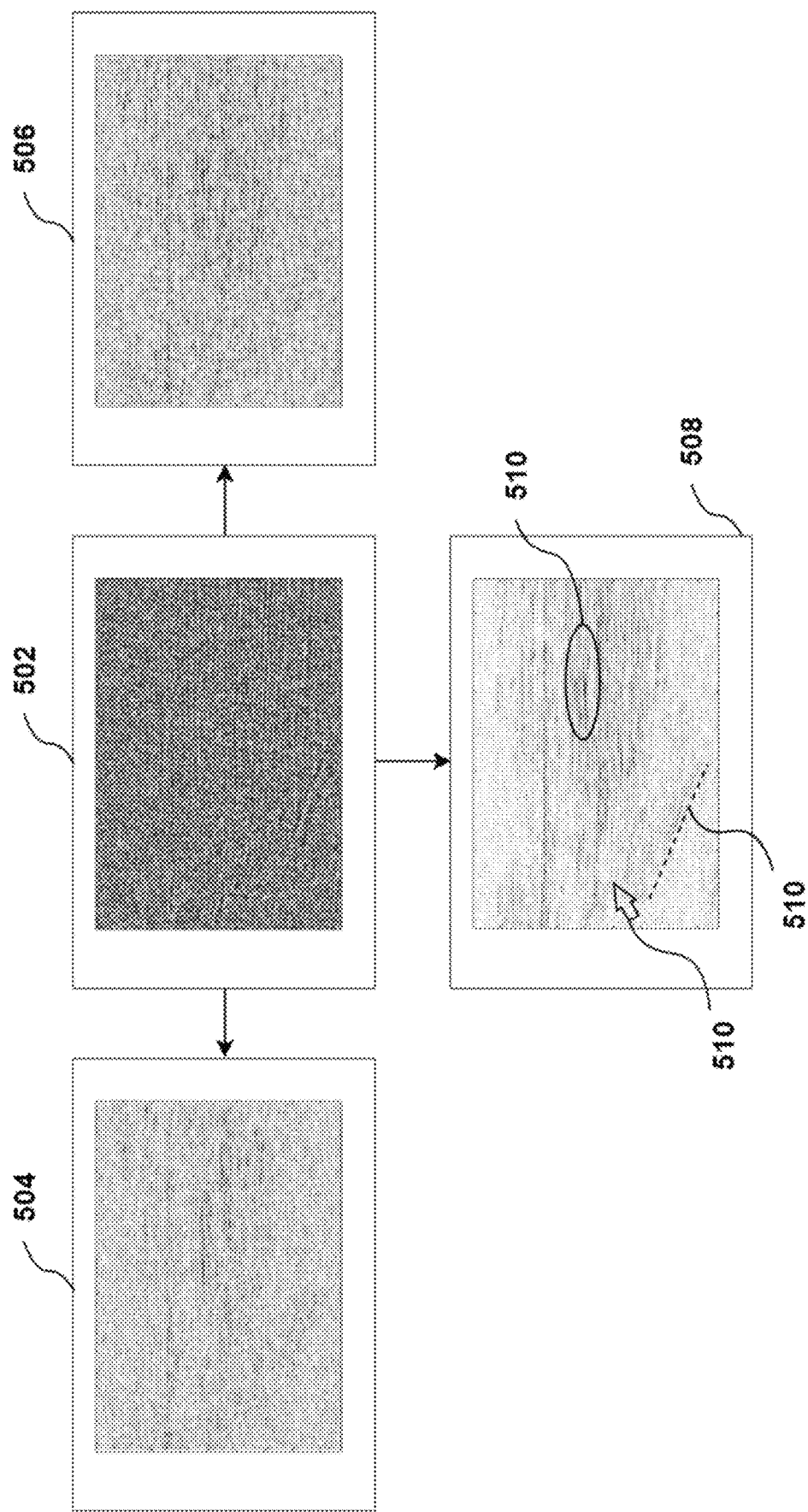
FIG. 5 is a series of example seismic image slices with varying analysis tuning.

FIG. 5 is a series of example seismic image slices with varying analysis tuning. Similar to FIG. 4, an original seismic slice 502 may be seen with high levels of noise throughout the slice of the 3D seismic image. As with FIG. 4, a conventional image slice 504 may be seen which may result from conventional wavelet packet transform processes, in which noise is still present and features have been lost due to over-suppression. Further, a one-level seismic image slice 506 may be seen, which has applied the proposed wavelet packet transform of the present disclosure, but has only performed one level of wavelet packet transform instead of the three levels proposed in the method 300 of FIG. 3. High levels of noise may be seen within the one-level seismic image slice 506, such that further wavelet packet transforms and filtering may be desirable for a clearer depiction of the features within the image slice. Comparatively, the proposed seismic slice 508 may be seen which has been generated according to the method 300 of FIG. 3. The noise levels may be seen to be less than each previous slice 502-506, and several features 510 may be seen within the proposed seismic slice 508. The features 510 may be visible within the previous slices 502-506, however the clarity of the features 510 is enhanced in the proposed seismic slice 508 with greater noise suppression and edge detection without over-filtering or blurring of high-frequency details.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 6. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments have also been described herein with reference to block illustrations of methods, systems, and computer program products. It will be understood that blocks and/or combinations of blocks in the illustrations, as well as methods or steps or acts or processes described herein, can be implemented by a computer program comprising a routine of set instructions stored in a machine-readable storage medium as described herein. These instructions may be provided to one or more processors of a general purpose computer, special purpose computer, or other programmable data processing apparatus (or a combination of devices and circuits) to produce a machine, such that the instructions of the machine, when executed by the processor, implement the functions specified in the block or blocks, or in the acts, steps, methods and processes described herein.

These processor-executable instructions may also be stored in computer-readable memory that can direct a computer or other programmable data processing apparatus to function in a particular manner, such that the instructions stored in the computer-readable memory result in an article of manufacture including instructions which implement the function specified. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Figure 6:
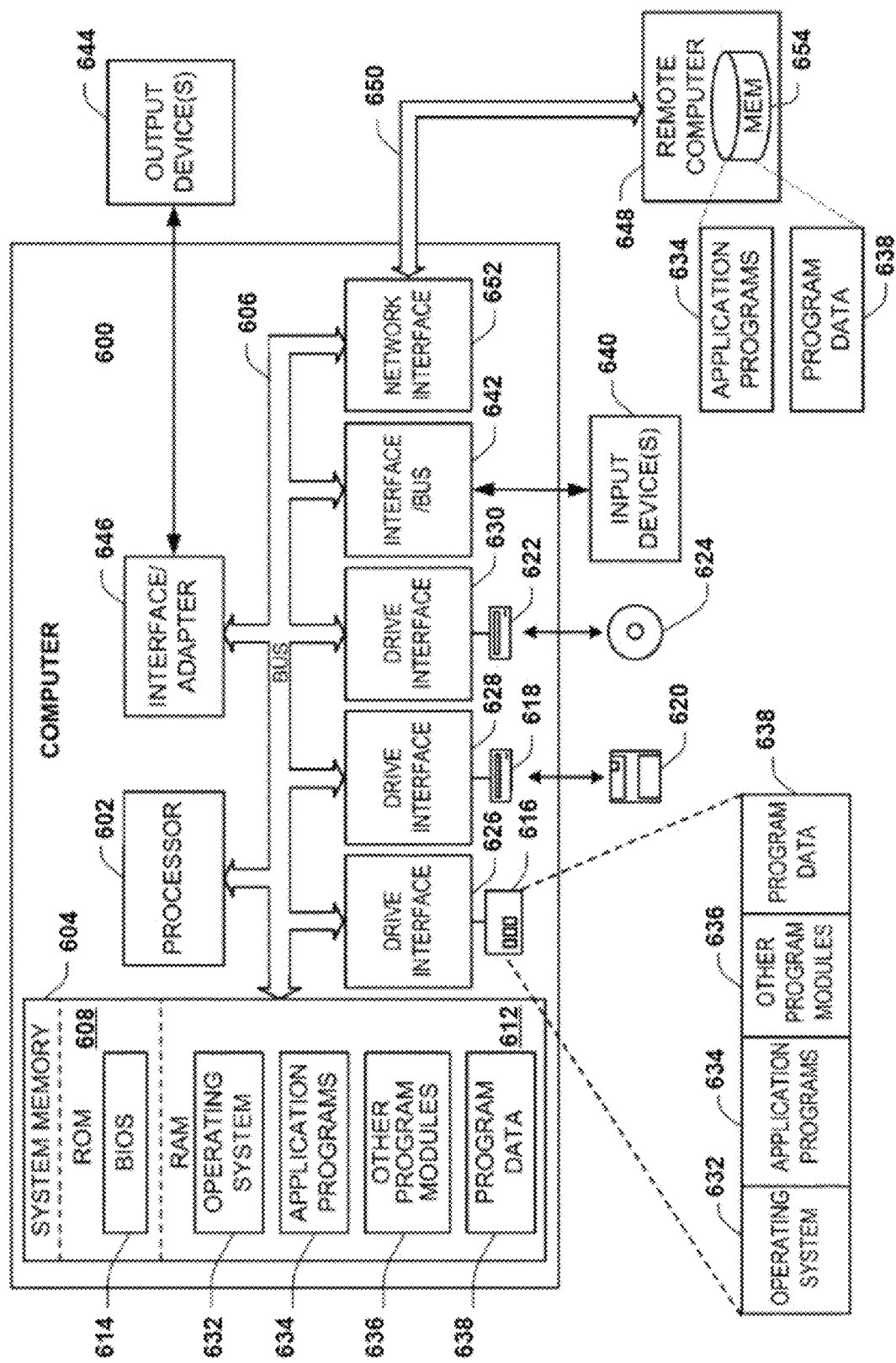
FIG. 6 is an example of a computer system that can be employed to execute one or more embodiments of the present disclosure.

In this regard, FIG. 6 illustrates one example of a computer system 600 that can be employed to execute one or more embodiments of the present disclosure. Computer system 600 can be implemented on one or more general purpose networked computer systems, embedded computer systems, routers, switches, server devices, client devices, various intermediate devices/nodes or standalone computer systems. Additionally, computer system 600 can be implemented on various mobile clients such as, for example, a personal digital assistant (PDA), laptop computer, pager, and the like, provided it includes sufficient processing capabilities.

Computer system 600 includes processing unit 602, system memory 604, and system bus 606 that couples various system components, including the system memory 604, to processing unit 602. Dual microprocessors and other multi-processor architectures also can be used as processing unit 602. System bus 606 may be any of several types of bus structure including a memory bus or memory controller, a peripheral bus, and a local bus using any of a variety of bus architectures. System memory 604 includes read only memory (ROM) 610 and random access memory (RAM) 612. A basic input/output system (BIOS) 614 can reside in ROM 610 containing the basic routines that help to transfer information among elements within computer system 600.

Computer system 600 can include a hard disk drive 616, magnetic disk drive 618, e.g., to read from or write to removable disk 620, and an optical disk drive 622, e.g., for reading CD-ROM disk 624 or to read from or write to other optical media. Hard disk drive 616, magnetic disk drive 618, and optical disk drive 622 are connected to system bus 606 by a hard disk drive interface 626, a magnetic disk drive interface 628, and an optical drive interface 630, respectively. The drives and associated computer-readable media provide nonvolatile storage of data, data structures, and computer-executable instructions for computer system 600. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and ROM 610, including operating system 632, one or more application programs 634, other program modules 636, and program data 638. In some examples, the application programs 634 can include the data retriever 206, the wavelet packet transformer 208, the sub-image storage 210, the sub-image filter 212, the Sobel filter module 214, the entropy calculation module 216, the inverse wavelet packet transformer 218, the sub-image merger 220, and the edge detector/reconstructor 222, and the program data 638 can include the original 3D seismic images, the sub-images for each level, the coefficients for each wavelet packet transform, and the ratio and threshold values. The application programs 634 and program data 638 can include functions and methods programmed to process 3D seismic images for noise suppression and edge detection, such as shown and described herein.

A user may enter commands and information into computer system 600 through one or more input devices 640, such as a pointing device (e.g., a mouse, touch screen), keyboard, microphone, joystick, game pad, scanner, and the like. For instance, the user can employ input device 640 to edit or modify wavelet packet transform parameters, filter ratios and thresholds, or to manipulate displayed reconstructed seismic images. These and other input devices 640 are often connected to processing unit 602 through a corresponding port interface 642 that is coupled to the system bus, but may be connected by other interfaces, such as a parallel port, serial port, or universal serial bus (USB). One or more output devices 644 (e.g., display, a monitor, printer, projector, or other type of displaying device) is also connected to system bus 606 via interface 646, such as a video adapter.

Computer system 600 may operate in a networked environment using logical connections to one or more remote computers, such as remote computer 648. Remote computer 648 may be a workstation, computer system, router, peer device, or other common network node, and typically includes many or all the elements described relative to computer system 600. The logical connections, schematically indicated at 650, can include a local area network (LAN) and/or a wide area network (WAN), or a combination of these, and can be in a cloud-type architecture, for example configured as private clouds, public clouds, hybrid clouds, and multi-clouds. When used in a LAN networking environment, computer system 600 can be connected to the local network through a network interface or adapter 652. When used in a WAN networking environment, computer system 600 can include a modem, or can be connected to a communications server on the LAN. The modem, which may be internal or external, can be connected to system bus 606 via an appropriate port interface. In a networked environment, application programs 634 or program data 638 depicted relative to computer system 600, or portions thereof, may be stored in a remote memory storage device 654.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A system comprising:
   a processor; and
   a memory storing machine readable instructions executable by the processor, the machine readable instructions comprising:
      a seismic image analysis tool comprising:
         a wavelet packet transformer to generate sub-images of a received, three-dimensional seismic image;
         a sub-image filter to perform noise suppression and edge detection on each sub-image;
         an inverse wavelet packet transformer to reconstruct higher level sub-images or seismic image from filtered sub-images; and
         a sub-image merger to recursively merge a sub-image and a reconstructed sub-image to generate a reconstructed and filtered three-dimensional seismic image.

2. The system of claim 1, wherein the sub-image filter employs a Sobel filter module, an entropy calculation module, or a combination thereof.

3. The system of claim 1, wherein the sub-image merger merges the sub-image and the reconstructed sub-image according to a predefined ratio.

4. The system of claim 1, wherein the wavelet packet transformer performs three levels of sub-image generation to generate 512 sub-images.

5. The system of claim 4, wherein the sub-image merger merges the reconstructed sub-image and the sub-image after each level of sub-image reconstruction.

6. The system of claim 1, wherein the received seismic image is received from a seismic array communicatively coupled to the system.

7. The system of claim 1, the seismic image analysis tool further comprising an edge detector to flag a plurality of edges in a reconstructed seismic image.

8. The system of claim 7, further comprising a display, wherein the reconstructed seismic image is visualized on the display.

9. A method comprising:
   performing a plurality of wavelet packet transforms on a three-dimensional seismic image and original sub-images;
   filtering a plurality of lowest-level sub-images;
   performing a plurality of inverse wavelet packet transforms on the plurality of lowest-level sub-images and subsequent reconstructed sub-images;
   merging the subsequent reconstructed sub-images with the original sub-images of a same wavelet packet transform level to recursively generate merged sub-images; and
   generating a reconstructed three-dimensional seismic image.

10. The method of claim 9, wherein merging the subsequent reconstructed sub-images with the original sub-images of a same wavelet packet transform level is performed between each inverse wavelet packet transform.

11. The method of claim 10, further comprising filtering the merged sub-images prior to performing further inverse wavelet packet transforms.

12. The method of claim 11, wherein the plurality of lowest-level sub-images comprises 512 third-level sub-images.

13. The method of claim 9, wherein filtering the plurality of lowest-level sub-images comprises Sobel filtering, entropy calculations, or a combination thereof.

14. The method of claim 9, wherein merging the subsequent reconstructed sub-images with the original sub-images of a same wavelet packet transform level to generate merged sub-images is performed using a tunable ratio.

15. The method of claim 9, further comprising performing edge detection on the reconstructed three-dimensional seismic image.

* * * * *